Patented Aug. 10, 1954

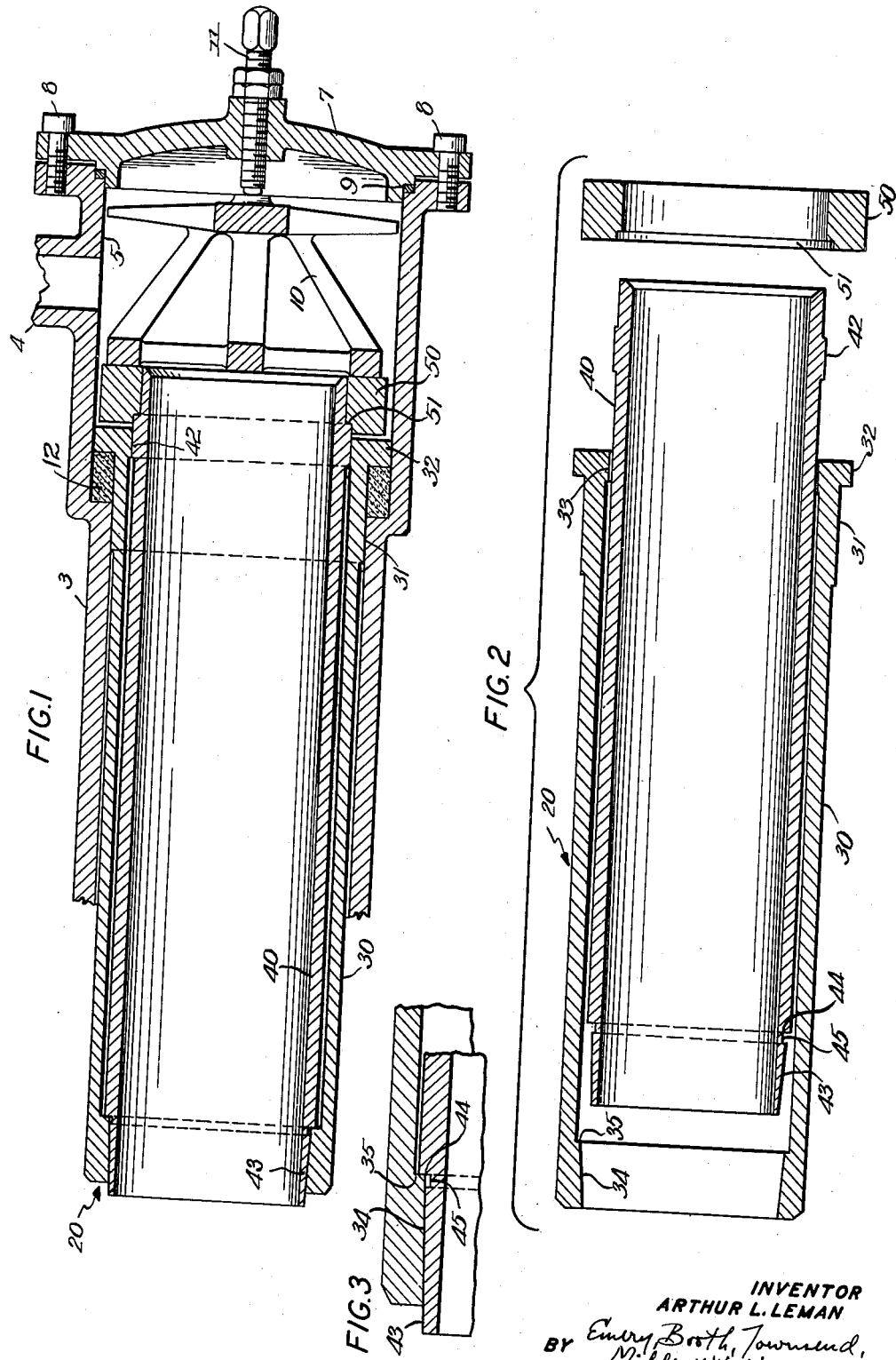

2,686,090

UNITED STATES PATENT OFFICE 2,686,090

RENEWABLE SLEEVE LINER FOR PUMPS

Arthur L. Leman, Houston, Tex.

Application February 23, 1951, Serial No. 212,283

9 Claims. (Cl. 309—3)

My present invention is directed to reciprocating piston pumps and has reference more particularly to the construction and arrangement of steel liners for the cylinders thereof. It has application specially to double-action reciprocating pumps employed in the pumping of liquids containing liquid or solid abrasives, as for example in the drilling of oil wells, generally known as slush pumps, and aims to provide an improved, renewable, sleeve-type cylinder liner for such devices.

In the drilling of deep wells in the oil field, it is desirable to circulate the mentioned liquids at as high a rate as possible. Accordingly, and at least when the drilling is near the surface, large bore liners are used in the pumps. When the drilling is deeper, more drill pipe is in use and the pressures become higher; it therefore becomes necessary to reduce the liquid circulation to prevent overloading the pump transmissions or engines.

The reduction of circulation is generally accomplished by replacing the mentioned large bore liners of the pump cylinders with liners of smaller bore, the stroke and speed of the pump remaining the same. However the reduced bore liners are more costly, and must be more frequently replaced, as their greater wall thickness renders them less readily hardened.

The mentioned reduction of pump circulation and other desired results have ben achieved more recently by the use of composite liners composed of cooperating interfitted inner sleeves and outer shells. Such liners require special provisions for packing the joint between sleeve and shell and for retainment of the sleeve against axial movement.

My present invention provides an inexpensive, simply designed, and ruggedly constructed removable sleeve liner which novelly makes use of a tapered metal-to-metal seal with a square shouldered stop, which does not get loose in service, and which lends itself to quick and easy installation and removal by hand tools ordinarily carried in the field.

In the drawings illustrating by way of example one embodiment of the invention:

Fig. 1 is a longitudinal sectional view of my novel sleeve liner assembly operatively installed in a pump cylinder;

Fig. 2 is a corresponding exploded sectional view of the liner assembly proper; and Fig. 3 is a partial view on a larger scale, showing end portions of the outer and inner elements of the liner, in assembled relation.

In Fig. 1 the head end of a pump cylinder is shown at 3, a fluid outlet to a discharge valve (not shown) being indicated at 4. The cylinder end has a conventional counter-bore as at 5, the outer end being normally closed by a cover plate or head 7. Such cylinder head 7 is removably held in position as by bolts 8, and may be sealed by a gasket 9.

My novel liner in the entirety is indicated generally at 20. It is held lengthwise in the pump cylinder as by a spider 10 which is urged against the end of the liner by a screw 11 turned up in head 7. As shown separately in Fig. 2 the liner 20 as an assembly or unit comprises simply an outer cylindrical bushing or shell 30, a telescoping inner sleeve 40, and a bearing ring or gland 50.

The outer cylindrical member, bushing, or shell 30 has at the head end a neck portion 31 of an outer diameter to seat in the pump cylinder 3. Outwardly beyond the neck portion is a larger diametered retainer flange 32 the inner radial face of which engages the usual liner packing 12 which is proportioned and arranged for sealed seating against the internal shoulder provided by the cylinder counter-bore 5.

Internally the outer element or shell 30 is specially constructed at each end portion. At the head end it is formed with an internal annular flange or bearing collar 33. At the foot it has an outwardly tapering conical sleeve-receiving and sealing flange 34 terminating at the inner wider end in an infacing annular abutment or stop shoulder 35. In the practice of the invention, the face of flange 34 is accurately machined to the taper desired for sealing engagement with the insert sleeve 40, as will be explained hereinafter.

As clearly shown in Fig. 2, the sleeve 40 is formed externally near but spaced from the head end with an annular projection or collar 42, which is sized to telescope snugly in the encompassing shell bearing collar 33, effecting desired concentricity. At the opposite or foot end sleeve 40 is externally reduced to present a circumferential wall portion 43 tapering outwardly conformantly to the receiving and sealing flange 34 of the shell. As indicated on the drawing these outwardly tapering end formations 34 and 43 of the shell 30 and sleeve 40 respectively are elongated and have a flat taper, at an angle substantially under the normal slip angle for steel on steel, being shown as not greater than about 7½° to the common axis of the shell and sleeve. It is also noted that the length of the sleeve taper 43 is greater than twice the maximum wall thickness of the sleeve at said tapered portion which is under the sealing and clamping engagement with the shell. This sleeve taper 43 is importantly spaced radially and axially from an outfacing radial stop shoulder 44 at the adjacent end of the main portion of the sleeve. As will be clear from the drawing, this stop shoulder 44 on the inner sleeve 40 is arranged for axial thrust supporting interlock with the outer shell 30 at the infacing stop shoulder 35 of the latter. It will be apparent that the described rigid, sealing interfitting of the sleeve and liner is obtained in accordance with the invention throughout and only at a metal to metal interface, directly between the parts, without the intervention of any separate bushing or the like spacing or sealing element or medium.

The liner sleeve 40 is easily fabricated in various bore sizes from tubular stock, being finished in all cases with a smooth, uninterrupted inner wall to receive the pump piston and in a thickness lending itself readily and uniformly to heat treatment and the like surface hardening processes. In accordance with the invention, changes in the pump capacity and cylinder diameter are effected by varying the thickness of the outer member or shell 30, in degree corresponding to such diameter change. Thus the present invention contemplates the provision or replacement of a shell and sleeve unit or set for each cylinder size, or at each change in pump capacity.

In further accordance with the invention means is provided whereby the sleeve 40 and shell 30 are demountably but securely and rigidly held in fixed interrelation in the cylinder 3 with the sleeve and shell under axial and more importantly substantial radial compression and tension respectively.

For this purpose I provide an annular thrust bearing ring or gland 50 which is dimensioned internally for sliding reception on the axially projecting head end of the sleeve 40. The inner wall of gland 50 is annularly recessed as at 51 for encompassing and abuttive engagement with the outfacing adjacent shoulder formed by the sleeve collar 42. As shown in Fig. 1, the gland 50 transmits the liner-retaining axial thrust from the cap screw 11 and through the spider 10 onto the cylindrical members of the liner assembly. The gland thrust transmission is directly to the inner element or sleeve 40, through it onto the shell 30 by reason of the interengagement at the remote or foot ends of the sleeve and the shell, and through the retainer flange 32 at the head end of the shell to packing 12, sealingly compressing the same against the hereinbefore mentioned internal shoulder formed by cylinder counter-bore 5. The inner sleeve 40 is thus placed in axial compression and the outer shell 30 in axial tension. In addition the sleeve and shell are radially stressed at the foot end, likewise in compression and tension respectively.

The assembly of the simply designed but ruggedly constructed liner provided by my present invention is quickly and easily accomplished. The shell 30 and the sleeve 40 preferably are first interfitted, hand tight. The two together are telescoped within the head end of the cylinder, the shell retainer flange 32 abutting the said packing 12 seated in the cylinder counter-bore 5. Shell and sleeve are brought into firm well-sealed contact by engagement of the sleeve taper 43 with the wedgingly encompassing shell flange 34 and are rigidly interfitted in the desired concentric relationship by the aforementioned close fit of the sleeve collar 42 with the surrounding shell collar 33. As hereinbefore mentioned, these contacting shell and sleeve surfaces are machined and ground to close tolerances, whereby the desired firm sealing engagement is had. Gland 50 is placed over the projecting head end of sleeve 40 and the spider 10 and cylinder head 7 fitted into place.

In accordance with the invention, the shell and sleeve are so proportioned that the outfacing radial shoulder 44 of the sleeve 40 is axially spaced or stands off some distance from the infacing shell shoulder 35 when the liner is set up hand tight. The herein single central installing screw 11 is then turned up until shoulders 35 and 44 engage; Figs. 1 and 3. The liner assembly as a whole and also packing 12 are thereby subjected to desired axial sealing and retaining thrust, and the shell and sleeve are placed under very considerable radial tension and compression at the ground metal to metal tapered joint 34, 43. The amount of compression and tension is regulated by the degree of taper of the sealing surfaces 34, 43 and by the amount of stand off.

From the description in connection with the drawings it will be understood that shell 30 and sleeve 40 are relatively secured by an intersleeve clamping action at their inner or foot ends and sealed solely by metal to metal contact, as between tapered annular surfaces 34, 43 at the inner or foot ends, and at the outer ends are concentrically held by the engagement between cylindrical annular surfaces 33, 42. This metal to metal interfitting of the shell and sleeve insures metal interfitting of the liner assembly throughout a tight sealing of the liner assembly throughout the entire service life of the sleeve. It will be understood also that by reason of the mentioned tight seal at the tapered joint 34, 43 no injurious fluid flow may occur in such annular space as may separate the intermediate body of the sleeve and shell. By the present invention, therefore, there is provided a reciprocating pump liner which is novelly sealed by a tapered metal to metal joint which is seated and firmed in series with the liner packing but which remains tight and seals off irrespective of the wear and loosening up of the packing 12 in use.

As noted previously, a cylinder bore may be easily and inexpensively changed or renewed with my novel liner. For renewal of the cylinder wall, only the sleeve 40 need be removed. Such sleeve has superior wearing qualities by reason of its described hardening and sealing characteristics and rugged overall design. As hereinbefore noted, each change in the cylinder bore size is accomplished in accordance with my invention by the substitution of another liner, including shell, sleeve and gland. It is herein again pointed out that as the bore size decreases, the outer shell 30 becomes correspondingly thicker, the sleeve wall thickness thus remaining substantially constant, avoiding problems of uniform hardening of thick metal masses. Thus the element subject to the most wear is inexpensively fabricated from tubular stock of appropriate relatively thin wall dimension.

From the foregoing it will be appreciated that I have novelly provided a pump cylinder liner which is quickly, easily and inexpensively installed and replaced, and which is comprised of a minimum number of parts, adapted to be retained in position under desired seal under all operating conditions.

My invention is not limited to the particular embodiment thereof illustrated and described herein, and I set forth its scope in my following claims.

I claim:

1. In a pump having a cylinder for a reciprocating piston, a cylinder liner shell, external means on the shell for endwise abuttive engagement with a cylinder wall, a hardened metal sleeve coaxially positionable in the shell by telescoping entry at one end thereof, opposed annular bearing means on the shell and sleeve effecting concentricity thereof in the region of said entry end, radially and axially interengageable conical walled sealing means and radially walled stop means for the sleeve and shell remote from said end, whereby when the sleeve is subjected to endwise thrust at the entry end the liner is axially retained against said cylinder wall and the sleeve and shell are rigidly interrelated under axial and also substantial radial compression and tension.

2. The structure of claim 1 wherein both said sealing means comprise mating metal formations integrally provided on the sleeve and the shell, whereby the liner seal is obtained only and throughout at a metal to metal interface.

3. The structure of claim 1 including an external shoulder at the entry end of the sleeve in axially spaced relation to the shell in the assembled position of the parts, and an annular bearing ring engageable endwise with said shoulder and adapted to receive and transmit the endwise thrust thereto.

4. A sleeve liner for the cylinders of reciprocating piston pumps comprising a cylindrical shell having at the head end an external retainer flange and an internal annular rib and at the foot an internal outwardly tapering annular flange forming an infacing stop shoulder, a hardened metal sleeve receivable coaxially in the shell and having at the head end an external rib dimensioned for concentric bearing interfit with the shell internal rib and at the foot a reduced external annular wall portion dimensioned and tapering conformantly to the shell internal foot flange and adjacent thereto an outfacing stop shoulder positioned for abuttive engagement with said infacing shoulder of the shell, and a gland receivable on the head end of the sleeve in axial abuttive engagement therewith whereby when said gland is subjected to axial thrust forcing the tapering wall portion of the sleeve against the tapered flange of the shell and holding the external retainer flange of the shell against a pump cylinder wall the sleeve and shell are intersecured in metal to metal contact at both ends and under axial and also substantial radial compression and tension respectively.

5. A liner according to claim 4, wherein the sleeve and shell are proportioned and arranged at their inner ends for stand off of said outfacing and infacing shoulders when the liner is set up by hand, whereby additional telescoping of the sleeve and shell is permitted under axial thrust so as to afford a preselected degree of radial compression and tension of said sleeve and shell.

6. A sleeve liner for the cylinder of a reciprocating pump, comprising an outer shell having an outer cylinder-head end and an inner end, an inner sleeve of a length and outer diameter for positioning in and by the respective ends of the shell and having an outer end construction to receive thrusting contact by means on the pump cylinder head thereby to urge the sleeve into and retain it in the shell, a flatly tapered concentric circumferential external surface on the inner end portion of the sleeve and a like internal surface on the corresponding end portion of the shell, the sleeve at said tapered end portion being of the same internal diameter as that of the adjoining and major portion of the sleeve, said tapered surfaces of the sleeve and shell being at such limited angle to the axis as to be within the holding friction angle and being yieldably engageable with each other to form thereby a fluid seal, and positive metal to metal stop provision between the shell and the sleeve.

7. A sleeve liner according to claim 6 wherein the seal-forming surfaces are at an angle of not greater than about 7.5° to the sleeve axis.

8. A sleeve liner according to claim 6 wherein said inner end portion of the sleeve is so tapered and proportioned that the axial extent of said portion is greater than twice the maximum wall thickness of the sleeve under the seal.

9. A sleeve liner for the cylinder of a reciprocating pump, comprising an outer cylindrical metal shell and a hardened metal sleeve removably receivable in the shell, cooperative interior and exterior outwardly flat-tapering elongate inner end portions on the shell and sleeve respectively, and axially opposed shoulders on the shell and sleeve adjacent said flat-tapering end portions, the latter affording a friction clamping and metal to metal inter-seal wherein the shell is radially tensioned and the sleeve is radially compressed, and said shoulders cooperating with the seal predeterminedly to regulate said radial tension and compression and to place the shell under axial tension and the sleeve under axial compression when the sleeve-containing shell is installed in a pump cylinder and locking-up pressure is applied at the outer end of the sleeve.

References Cited in the file of this patent

UNITED STATES PATENTS

| Number | Name | Date |
|---|---|---|
| 1,496,247 | Sill | June 3, 1924 |
| 1,510,042 | Clewett | Sept. 30, 1924 |
| 1,730,905 | Thomas et al. | Oct. 8, 1929 |
| 2,412,587 | Larson | Dec. 17, 1946 |
| 2,447,027 | Pielop, Jr. | Aug. 17, 1948 |
| 2,530,246 | Kirkpatrick et al. | Nov. 14, 1950 |